United States Patent [19]

Lander

[11] Patent Number: 4,820,244
[45] Date of Patent: Apr. 11, 1989

[54] VARIABLE RATIO DRIVE MECHANISM

[76] Inventor: Jack Lander, 55 Mill Plain Rd., #23-5, Danbury, Conn. 06811

[21] Appl. No.: 217,452

[22] Filed: Jul. 11, 1988

[51] Int. Cl.[4] .............................................. F16H 55/54
[52] U.S. Cl. ...................................................... 474/56
[58] Field of Search ......................... 474/49, 50, 52-57

[56] References Cited

U.S. PATENT DOCUMENTS

| | | | |
|---|---|---|---|
| 3,150,529 | 9/1964 | Walk | 474/56 |
| 3,757,594 | 9/1973 | Kumm | 74/230.17 |
| 3,938,403 | 2/1976 | Donaldon | 474/56 |
| 4,024,772 | 5/1977 | Kumm | 74/230.16 |
| 4,295,836 | 10/1981 | Kumm | 474/51 |
| 4,591,351 | 5/1986 | Kumm | 474/49 |
| 4,714,452 | 12/1987 | Kumm et al. | 474/49 |

FOREIGN PATENT DOCUMENTS 0489860  1/1954  Italy ...................................... 474/49

*Primary Examiner*—Thuy M. Bui
*Attorney, Agent, or Firm*—Perman & Green

[57] ABSTRACT

The described invention includes a rotatably mounted drive mechanism which is provided with a plurality of radially oriented tracks. The drive mechanism preferably comprises a pair of opposed drive disks with colinear radial tracks having tooth-like formations arranged therein. A movable sheave segment is mounted in each track. Each sheave segment is engaged by an endless belt when the drive mechanism traverses through a predetermined arc of rotation but is disengaged from the drive belt when outside the predetermined arc of rotation. Toothed engagement blocks are associated with each sheave segment to provide a engagement blocks for locking the sheave segment into place in the track. A wedge cam is associatd with each sheave segment and is forced by belt pressure to rigidly bias the sheave segments' toothed engagement blocks against the tooth-like formations in the track. Spring(s) are also provided to resiliently bias the toothed engagement blocks into engagement with the track so that the sheave segments are lightly held in place even when out of engagement with the drive belt.

13 Claims, 3 Drawing Sheets

VARIABLE RATIO DRIVE MECHANISM

REFERENCE TO RELATED APPLICATION

This application is related to U.S. patent application Ser. No. 07/217,480 filed on even date herewith; assigned to the same assignee hereof; and entitled Improved Variable Ratio Drive Mechanism, to H. Leonard.

FIELD OF THE INVENTION

This invention relates to variable ratio drive mechanisms and more particularly to an improved variable ratio drive mechanism particularly adapted for use with bicycles.

BACKGROUND OF THE INVENTION

Variable speed drives using chains and sprockets have been employed with bicycles for many years. The drawbacks of such systems are well known and are described in U.S. Pat. No. 4,030,373 to H. Leonard. Therein is disclosed a variable ratio transmission for bicycles which includes a plurality of movable sheave segments, with each sheave segment having a releasable toothed retaining means which normally retains the sheave segment at a fixed radial position in a toothed track. That structure is, essentially, a variable diameter pulley or sheave, whose diameter is adapted to be selectively adjusted by the rider. A flexible belt is wrapped around and engages different adjacent sheave segments to impart rotary motion to the drive mechanism. The relative position of each sheave segment in its toothed track is adjusted only when a sheave segment comes out of contact with the drive belt.

The mechanism described in the '373 patent for locking each sheave segment into place after adjustment contains relatively small and highly stressed parts requiring close manufacturing tolerances. The setting mechanism is sensitive to both axial location and warpage. Locking surety also degrades somewhat with wear.

In U.S. Pat. No. 4,530,676 to H. Leonard, an improved variable ratio drive mechanism is disclosed which also employs driving and driven sheaves, each of which is provided with a set of adjustable sheave segments. In that mechanism, individual sheave segments are one-piece, belt-loaded-locked units which engage saw-tooth shaped steps along associated trackways. The center line of each sheave segment is offset from a radial line so that the belt's force on each sheave segment applies an offset torque which forces the sheave segment's teeth into engagement with opposed saw tooth steps along one side of the trackway. When each sheave segment becomes free of the belt's force, it can be engaged by a shifter which causes it's teeth to move out of engagement with the track's steps. The sheave segment is then radially movable in either an outward or inward manner. In order to unlock the sheave segment's teeth from engagement, means are provided to cause a modest amount of rotation of a segment's teeth so that they can ratchet up or down relative to the track's steps. This design is not suitable for small sheave diameters and for applications involving relatively resilient belts which are subjected to grossly fluctuating driving tensions. Furthermore, the design is adapted only to a single direction drive.

In U.S. patent application Ser. No. 140,232, filed Dec. 31, 1987 and entitled "Variable-Ratio Transmissions, Separately and In Bicycles" to H. Leonard, there is disclosed still another improved transmission of the type that includes sheave segments coupled together by a drive belt. That transmission employs a sheave segment locking mechanism which runs the full length of each disk track in the drive mechanism. The locking mechanism described therein is controlled by a fixed path cam whose action is unrelated to the radial position of the sheave. More specifically, the locking mechanism is released and removed from interaction with an individual sheave segment by a cam means which is operative only when the sheave segment is out of contact with the drive belt. Under those circumstances, the sheave segment is free floating and can be either moved inwardly or outwardly by a shift mechanism. In this mechanism, positive and consistent lock-up is dependent upon light springs and free fitting, cooperating parts. Relatively close tolerances are required and lock-up surety decreases with wear.

Accordingly, it is an object of this invention to provide an improved variable ratio drive mechanism of simple design.

It is a further object of this invention to provide an improved variable ratio drive mechanism which exhibits substantial resistance to wear and positive lock-up.

It is another object of this invention to provide an improved variable ratio drive mechanism which is adapted to bidirectional operation.

SUMMARY OF THE INVENTION

In accordance with the above objects, the invention relates to an apparatus for positioning a bearing surface relative to a track. The invention, in one embodiment, includes a rotatably mounted drive mechanism which is provided with a plurality of radially oriented tracks. The drive mechanism preferably comprises a pair of opposed drive disks with colinear radial tracks having tooth-like formations arranged therein. A movable sheave segment is mounted in each toothed track. Each sheave segment is engaged by an endless belt when the drive mechanism traverses through a predetermined arc of rotation but is disengaged from the drive belt when outside the predetermined arc of rotation. Toothed means are associated with each sheave segment to provide a means for locking the sheave segment into place in the track. Wedge-cam locking means associated with each sheave segment are forced by belt pressure to rigidly bias the sheave segments' toothed means against the tooth-like formations in the track. Spring means are also provided to resiliently bias the toothed means into engagement with the track so that the sheave segments are lightly held in place even when out of engagement with the drive belt.

It should be noted that none of the above drawings are drawn to scale and that the segments and tracks are purposely drawn larger than the rest of the assembly to more clearly describe the invention.

DETAILED DESCRIPTION OF THE INVENTION

U.S. Pat. Nos. 4,030,373, 4,530,676 and U.S. patent application Ser. No. 140,232 all to H. Leonard, each describe variable ratio transmissions which are usable with both bicycles and other apparatus. The disclosures of those patents and application are incorporated herein by reference. The variable speed drive mechanism to be described below is particularly adapted for inclusion with the transmission described in the aforementioned patent application Ser. No. 140,232—with appropriate modifications being made thereto to accommodate this invention. For instance, the following structural changes to the transmission shown in the aforementioned application would be necessary: The slot geometry has been altered and affects the structure of disks 82, 84, 110 and 112 (see FIGS. 13 and 19); the radial camming structure has been eliminated i.e. parts 95, 96, 97 and 146 (see FIGS. 13, 15, and 18); the segment design has been changed (see 46 and 48 in FIGS. 7 and 13); and the locking method changed (parts 90 and 94 eliminated in FIG. 13).

Although the invention disclosed herein is described for use in a bicycle transmission, it is to be understood that it may be used in many other applications. In general, its application is for repositioning a bearing surface relative to a track.

Figure 1:
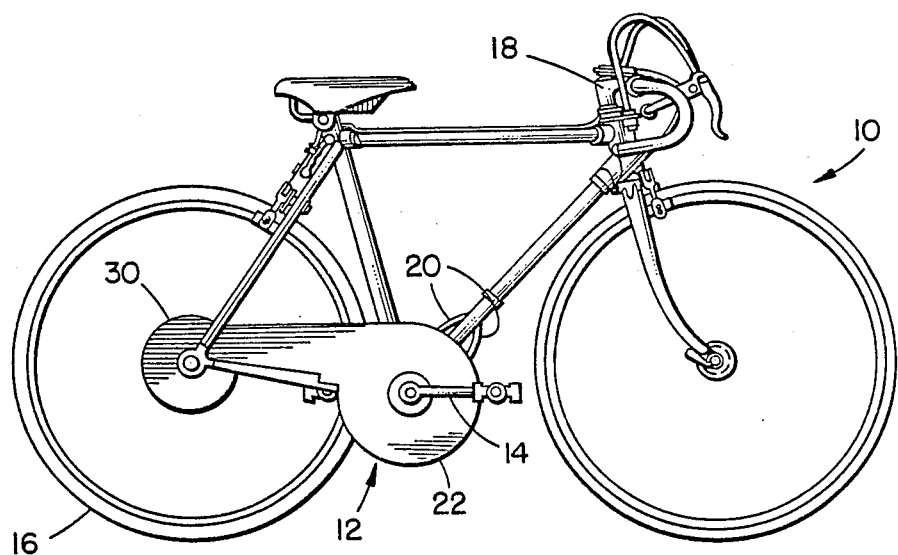
FIG. 1 is a right elevation of a typical bicycle equipped with a variable ratio drive mechanism embodying the invention.

Referring now to FIG. 1, a bicycle 10, of the commonly accepted form, is shown and includes an adjustable ratio transmission 12. Transmission 12 provides the drive coupling between pedal crank 14 and rear wheel 16. A manual transmission ratio control 18 includes a pivoted finger actuated member that is conveniently operable by the person riding the bicycle. Ratio control 18 enables the rider to control transmission 12 via cable means 20. The details of shift control 18 are disclosed in copending U.S. patent application Ser. No. 140,232 and will not be further described herein. Suffice to say that the movement of shift control 18 one way or the other has the effect of conditioning transmission 12 to change its ratio in progressive steps using force exerted by pedal crank 14. So long as shift control 18 remains off center, continued operation of the pedal crank 14 will cause, within design limits, continuous step by step change in the transmission's ratio.

Figure 2:
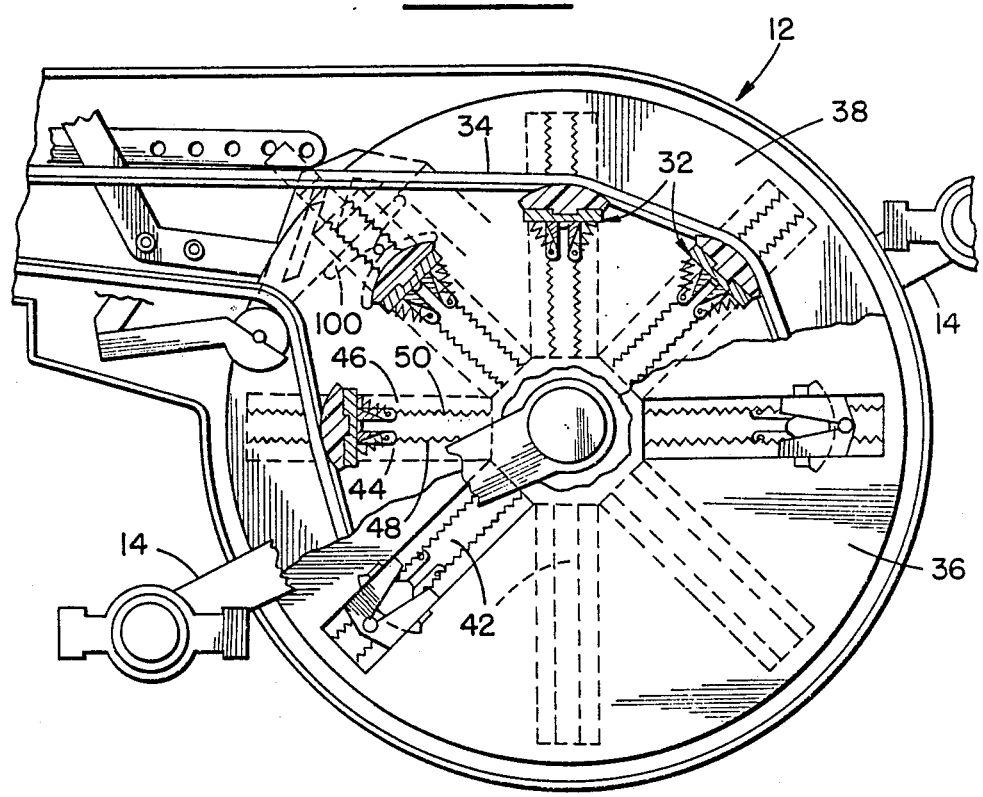
FIG. 2 is a right elevation of a variable ratio drive mechanism embodying the invention, a portion of which elevation has been broken away to show the internal arrangement of the sheave segments.

Referring now to both FIGS. 1 and 2, transmission unit 12 includes a front drive mechanism which includes within housing 22, an adjustable diameter sheave that is operated by pedal crank 14. Transmission unit 30 is mounted in rear wheel 16 and further includes a rear drive mechanism which may include either a fixed or variable diameter sheave. Transmission 12 and its variable diameter pulley or sheave includes a plurality of radially adjustable sheave segments 32. An endless member or belt 34 may be in driving or driven frictional contact with each of sheave segments 32. When a selected transmission ratio is in effect, sheave segments 32 are locked at a fixed radius so as to enable the creation of the desired transmission ratio.

Figure 3:
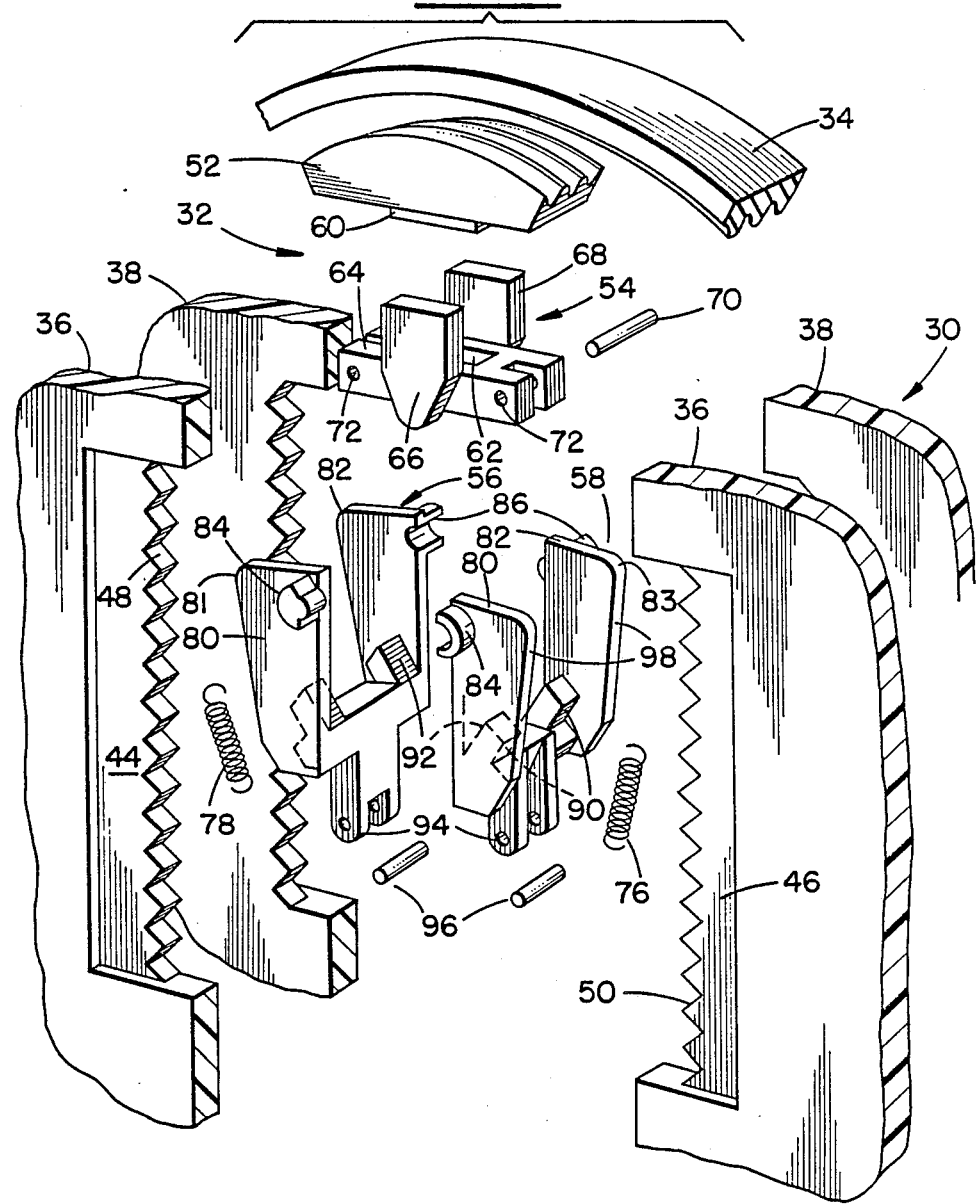
FIG. 3 is a fragmentary exploded perspective of the variable ratio drive mechanism shown in FIG. 2 with the pedal somewhat rotated.

Referring to FIGS. 2 and 3, drive mechanism 30 is further comprised of two, coaxial, spaced-apart disks 36 and 38 which form a unitary rotatable member coupled to pedal crank 14 and supported by roller bearings (not shown). Each of disks 36 and 38 is provided with a plurality of extended, toothed slots 42, which are radially aligned on disks 36 and 38 respectively. Each of slots 42 has formed thereabout on the outer surface of each of disks 36 and 38, indented areas 44 and 46 which encompass tooth-like formations such as teeth 48 and 50, respectively. In this embodiment, teeth 48 and 50 are oriented in parallel fashion; the sides of the teeth slant oppositely; meet at apexes and roots; and are aligned so that the roots and apexes thereof are directly opposite each other.

Each sheave segment 32 is shown in detail in FIG. 3 and comprises four main components: cap 42, a wedge cam assembly 54, a left engagement block 56 and a right engagement block 58. In this embodiment, cap 52 is grooved on its upper surface so as to mate with the grooved surface of endless belt 34. It is to be understood that other belt configurations, such as flat belts, can be used and in such cases, cap 52 is not provided with a grooved surface, but rather with a surface which properly mates with the belt's surface. Cap 42 may also incorporate a roughened surface for added friction between itself and a flat belt or it may be toothed to engage teeth in a toothed belt (such as are used with synchronous or timing belts). Cap 52 is further provided with a downwardly extending portion 60 which mates with opening 62 in wedge cam assembly 54. Portion 60 may be fastened into opening 62 by any suitable means so as to make a single unitary assembly of cap 52 and wedge cam assembly 54. Cap 52 and wedge cam assembly 54 may also be made as one piece, if desired.

Wedge cam assembly 54 comprises a bar 64 to which wedge cams 66 and 68 are rigidly attached. The upper portions of wedge cams 66 and 68 extend above cap 52 and act as guides for belt 34. The lower, bearing portions of wedge cams 66 and 68 perform the function of providing the force which locks a sheave segment 32 into position when cap 52 is in contact with drive belt 34. A pair of pins 70 (only one is shown) mate with holes 72 in wedge cam assembly 54 and provide anchor points for the attachment of springs 76 and 78, as will be hereinafter described.

Left and right engagement blocks 56 and 58 are mirror images of each other. Each engagement block includes a pair of outer retaining plates 80 and 82 which are adapted respectively, to slidably move in indented areas 44 and 46 on each of disks 36 and 38. Extending from the outer surfaces of retaining plates 80 and 82 are nubbins 84 and 86 which provide two functions. First, they provide pivot points about which left and right engagement blocks 56 and 58 may pivot during the operation of a sheave segment. Second, they provide an outward extension adapted to be engaged by shift gates of a shifting assembly to enable radial movement of each sheave segment in either the outward or inward direction.

Each of engagement blocks 56 and 58 is provided with a pair of toothed engagement surfaces 90 which are adapted, respectively, to interact with teeth 48 and 50 on disks 36 and 38. Each toothed engagement surface 90 is provided with an inward oriented follower surface 92 which is adapted to receive the lower most portions of wedge cams 66 and 68, respectively. The lowermost portions of left and right engagement blocks 56 and 58 include a pair of downwardly extending arm pairs 94 which are adapted to receive pins 96. Pins 96 form the lower anchors for springs 76 and 78, whose other ends are anchored to pins 70 in wedge cam assembly 54.

When the entire structure of FIG. 3 is assembled, cap 52 is fixedly emplaced between wedge cams 66 and 68. Wedge cam assembly 54 fits between retaining plates 80 and 82 of left and right engagement blocks 56 and 58, respectively. The lateral dimensions of wedge cam assembly 54 are such as to allow it to move easily within retaining plates 80 and 82 without binding. Under such conditions, nubbins 84 form a pivot axis for left and right engagement blocks 56 and 58. The lower most surfaces of wedge cams 66 and 68 rest upon follower surfaces 92 and tend to force apart engagement blocks 56 and 58. In addition, springs 76 also tend to bias apart left and right engagement blocks 56 and 58.

When left and right engagement blocks 56 and 58 are forced apart, toothed surfaces 90 are caused to mate with teeth 48 and 50 on disks 36 and 38, respectively. In this regard it should be noted that the outer most edges 98 of each of left and right retaining plates 80 and 82 are slanted slightly inwardly from top to bottom and are rounded at their uppermost extremities 81, and 83. When wedge cam assembly 54 forces the engagement blocks apart and edges 98 are forced towards the edges of indented areas 44 and 46, no engagement occurs therebetween. However, when retaining plates 80 and 82 are pivoted towards each other during shifting, rounded edges 81 and 83 ride on the edges of indented areas 44 and 46.

Figure 4:
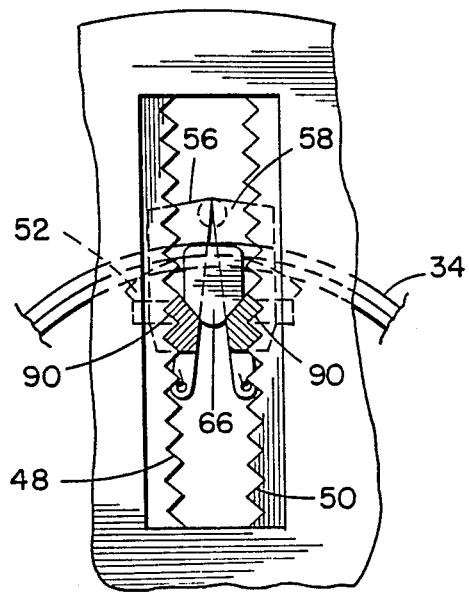
FIG. 4 is a fragmentary side elevation showing the orientation of various portions of the sheave segment when it is engaged by a drive belt.

FIG. 4 is a schematic drawing of a sheave segment with the outer retaining plates removed. Belt 34 bears down upon cap 52 which, in turn, imparts a downward force on wedge cam 66. Wedge cam 66 forces both the left and right engagement blocks 56 and 58 apart so as to cause toothed surfaces 90 to engage with teeth 48 and 50. Thus, the pressure exerted by drive belt 34 is seen to lock the sheave segment rigidly into place.

Returning to FIG. 2, it will be recalled that in each of the above noted patents and patent application incorporated herein by reference (as well as in this invention), sheave segments 32 are adapted for movement along radial tracks 42 only when out of engagement with belt 34. Thus, for the entire arc of rotation of drive mechanism 30 during which sheave segments 32 are engaged by belt 34, they are not enabled for radial transfer of position. When, however, a sheave segment 32 is out of contact with belt 34, the force directed radially inward on cap 52 and wedge cam assembly 54 is released. Thus, the downward pressure is also eased which keeps apart left and right engagement blocks 56 and 58, respectively. Nevertheless, springs 76 and 78 maintain toothed surfaces 90 in relatively lighter contact with teeth 48 and 50 during this interval to prevent relative movement therebetween.

Figure 5:
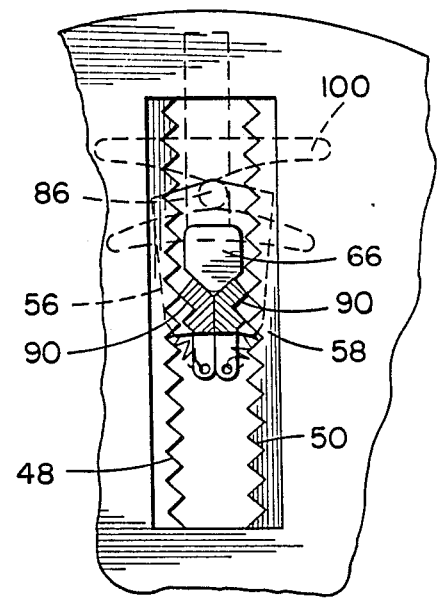
FIG. 5 is a fragmentary side elevation showing a sheave segment when it is both out of engagement with the drive belt and in engagement with the gate cams associated with the shift gate.

As shown in phantom in FIG. 2, shift mechanism 100 is positioned to engage a nubbin 86 when its associated sheave segment 32 is out of contact with belt 34. As is fully described in copending U.S. patent application Ser. No. 140,232, the position of shift mechanism 100 is movable both inwardly and outwardly in relation to drive mechanism 30. Thus, when one of the cam surfaces of shift mechanism 30 contacts a nubbin 86, the associated sheave segment 32 is caused to ratchet either inwardly or outwardly depending upon the orientation of shift mechanism 100. This interaction is shown schematically in FIG. 5 wherein shift mechanism 100 has engaged nubbin 86 and caused toothed surfaces 90 to come out of engagement with teeth 48 and 50. As the sheave segment moves either radially inward or outward, the interacting toothed surfaces ratchet, one against the other until nubbin 86 no longer engages the cam surfaces of shift mechanism 100.

Figure 6:
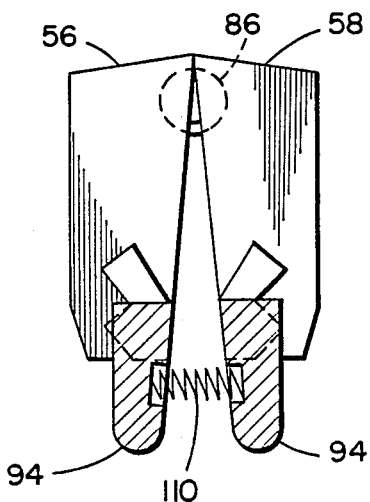
FIG. 6 is a section of a sheave segment with a modified bias arrangement.

Referring now to FIG. 6, there is schematically shown a modification to the sheave segments shown in FIGS. 2-5. Outer retaining plates 80 have been removed so as to enable better viewing of the modification. In lieu of having a pair of bias springs 76 and 78 to outwardly bias engagement blocks 56 and 58, a single compression spring 110 has been substituted which bears against arms 94 and biases toothed surfaces 90 into engagement with toothed tracks 44 and 50.

Figure 7:
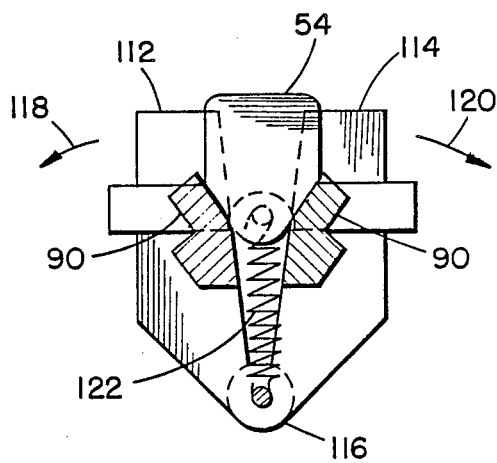
FIG. 7 is a section of a modified sheave segment which includes a pair of inverted, pivotally mounted locking blocks.

A still further modification of sheave segment 32 is shown in FIG. 7. Here again, the outermost retaining plates have been removed to show the interior structure of left and right engagement blocks 112 and 114. In this case, nubbin 116 is mounted in the most radially inward orientation and the engagement blocks open outwardly. Wedge cam assembly 54 is again adapted to force left and right engagement blocks 112 and 114 apart in the directions shown by arrows 118 and 120 respectively. Here, toothed surfaces 90 engage with teeth 48 and 50 on disks 36 and 38 in the identical manner as aforestated. A tension spring 122 is provided between a shaft connecting the nubbins and wedge cam assembly 54. Tension spring 122 acts to bias wedge cam assembly 54 inwardly thereby tending to force left and right engagement blocks 112 and 114 apart to maintain the sheave segment in place even when it is not engaged by belt 34.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a variable ratio drive mechanism, the combination comprising:

a rotatably mounted drive mechanism having a plurality of tracks with tooth like formations therein;

an endless drive member;

a plurality of movable sheave segments, each sheave segment mounted in association with a track and including toothed means and cam locking means, said cam locking means movable relative to each said sheave segment and engaged by said endless drive member when said drive mechanism traverses through a predetermined arc of rotation, but disengaged from said drive member when said drive mechanism is outside said predetermined arc of rotation, said cam locking means impelled by pressure exerted when engaged with said endless drive member to rigidly bias said toothed means against said track; and means associated with each said sheave segment for resiliently biasing its toothed means into engagement with said track.

2. The mechanism as recited in claim 1 further comprising:
nubbin means coupled to each said toothed means; and
shift means for engaging said nubbin means and overcoming said resilient bias to thereby cause movement of a sheave segment, said shift means positioned to engage said nubbin means outside said predetermined arc of rotation.

3. The mechanism as recited in claim 2 wherein said track includes two, opposed, toothed tracks and said toothed means includes a pair of pivotally mounted, toothed engagement arms.

4. The mechanism as recited in claim 3 wherein said resilient biasing means comprise springs connected to each toothed engagement arm.

5. The mechanism as recited in claim 3 wherein said resilient biasing means comprises compression spring means, said compression spring means mounted between said toothed engagement arms and acting to bias them away from each other and towards said toothed tracks.

6. The mechanism as recited in claim 3 wherein said nubbin means forms the pivot point for said toothed engagement arms.

7. The mechanism as recited in claim 6, wherein each said toothed engagement arm is provided with a bearing surface adapted to be engaged by said cam means, each bearing surface oriented to force its associated toothed engagement arm into rigid engagement with a toothed track, said bearing surfaces oriented to receive said cam means from the direction of said nubbin means.

8. The mechanism as recited in claim 6 wherein each said toothed engagement arm is provided with a bearing surface adapted to be engaged by said cam means, each bearing surface oriented to force its associated toothed engagement arm into rigid engagement with a toothed track, said bearing surfaces oriented to receive said cam means from a direction opposite to said nubbin means.

9. The mechanism as recited in claim 8 wherein said resilient biasing means comprises a tension spring mounted between the axis of said nubbin means and said sheave segment.

10. Apparatus for repositioning a bearing surface relative to a track having tooth-like formations therein comprising:
segment means having locked and unlocked conditions and tooth-like formations adapted to engage said tooth-like formations on said track when said segment means is in the locked condition;
shift means for moving the segment means to a new position relative to the track; and
locking means associated with said bearing surface and engageable with said segment means, said locking means being movable relative to said segment means to bias its tooth-like formations against said tooth-like formations on said track to create said locked condition.

11. The invention as defined in claim 10 further comprising:
belt means in association with said bearing surface for moving said locking means to bias said segment means into said locked condition.

12. The invention as defined in claim 10 further comprising:
spring bias means for maintaining said tooth-like formations on said segment means in engagement with said tooth like formations on said track.

13. The invention as defined in claim 10 further comprising:
means for moving said segment means and cam means out of contact with said belt means, said shift means being positioned to move said segment means only when said segment means is out of contact with said belt means.

* * * * *